Jan. 12, 1965  E. SOLA  3,165,385
APPARATUS FOR DRYING FISH
Filed Oct. 4, 1960  2 Sheets-Sheet 1

INVENTOR:
EINAR SOLA.
BY Bierman & Bierman
Attorneys

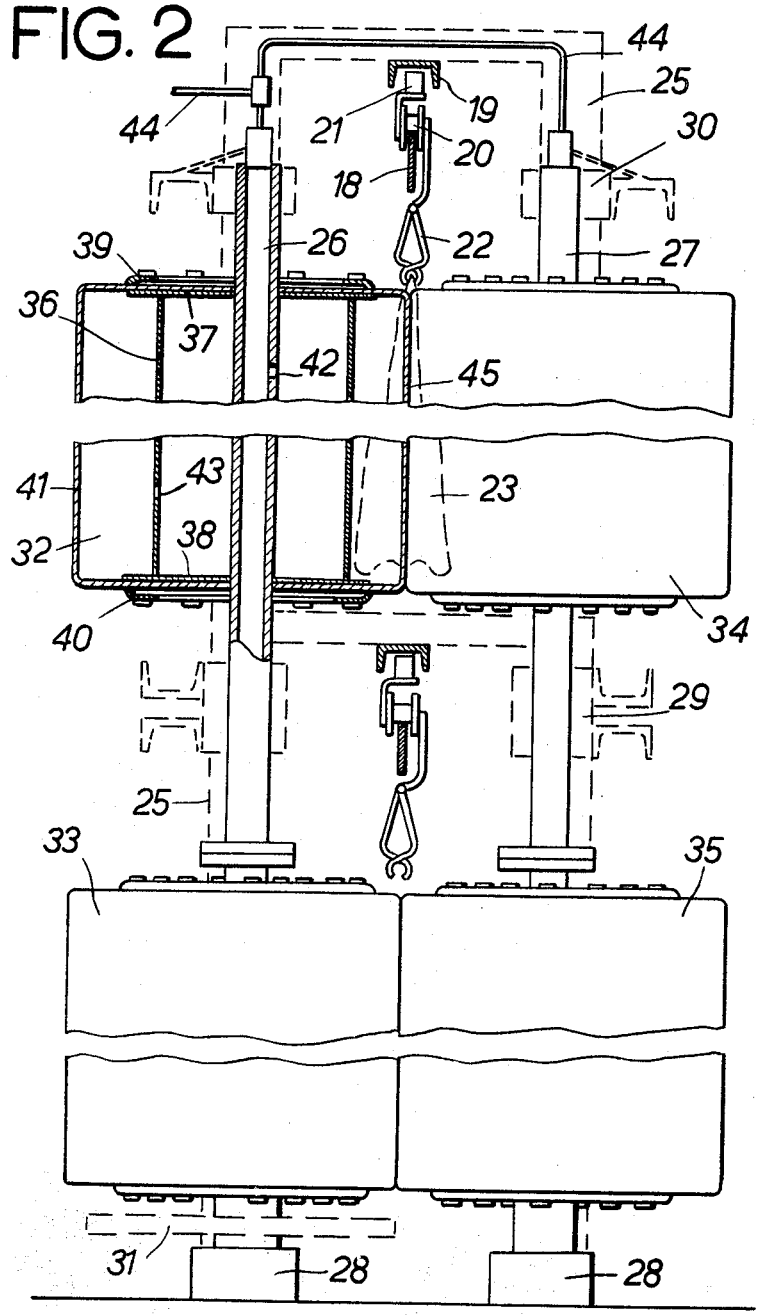

_United States Patent Office_

3,165,385
Patented Jan. 12, 1965

3,165,385
APPARATUS FOR DRYING FISH
Einar Sola, Bergen, Norway, assignor to Fiskeridirektoratets Kjemisk-Tekniske Forskningsinstitutt, Bergen, Norway
Filed Oct. 4, 1960, Ser. No. 60,377
5 Claims. (Cl. 34—70)

This invention relates to the drying of fish, particularly the drying of cod flakes ("bacalao fish").

A large part of the seasons's catch of codfish, particularly in Newfoundland and Norway, is processed by splitting, salting and drying the codfish to form a cod flake product well known in the trade under the name "bacalao" or "bacalao fish."

In order to avoid deterioration during drying, and to secure the best quality possible of the product, the drying temperature must be kept as low as possible, preferably below 15° C. Furthermore, the partly dried fish flakes are subjected to one or more pressing operations during drying.

Due to the special conditions which necessarily must be maintained during drying, it has been extremely difficult to improve the old and troublesome hand labour methods heretofore used in the art. Said methods have involved a lengthy drying time and a considerable amount of manual labour, which has been necessary in order to perform the different operations in the correct way and at the correct time. Many attempts have been made to replace the lengthy and troublesome air drying process by a process of forced drying in which the split and salted fish is subjected to a stream of drying medium. However, great difficulties arise because the fish has to be pressed at intermediate stages during drying and conventional roll presses have not been satisfactory in such pressing operations.

One object of the present invention is to provide an improved method of pressing fish in a continuous operation whereby all parts of the fish are subjected to substantially equal pressures in the pressing apparatus. Another object of the invention is to provide an apparatus enabling the fish to be pressed without the necessity of removing the fish from suspending means by which the fish is suspended when it is conveyed through a drying zone.

The method of drying cod flakes according to the present invention comprises the step of conveying the cod flakes in a continuous path within a closed drying chamber and past a pressing station comprising a pair of rolls rotating at a speed corresponding to the rate of travel of the cod flakes, at least one of said rolls comprising an inflatable bag arranged to form a resilient support for the cod flakes while they are subjected to pressure from the other roll.

In a preferred embodiment, both rolls comprise inflatable bags.

A preferred embodiment of drying plant for drying raw cod flakes, according to the present invention, comprises a housing, an endless conveyor enclosed within said housing, said conveyor having a first run extending in a zigzag pattern within said housing and a second run forming a connection between the ends of said first run, roller means being arranged at the ends of said first run to guide the conveyor thereat, and a pressure applying device arranged in said second run intermediate said roller means and comprising a pair of inflatable bags, one on each side of said run, said bags being spaced by a distance less than one half of the sum of the diameters of said bags.

In order that the inventon may be more fully understood a preferred embodiment of the drying plant, and the method of operating the same, will now be described, by way of example only, with reference to the accompanying drawings, in which:

FIGURE 2 is an enlarged lateral view of the pressure applying device used in the apparatus of FIGURE 1, somewhat simplified and with some parts shown in a sectional view.

Figure 1:
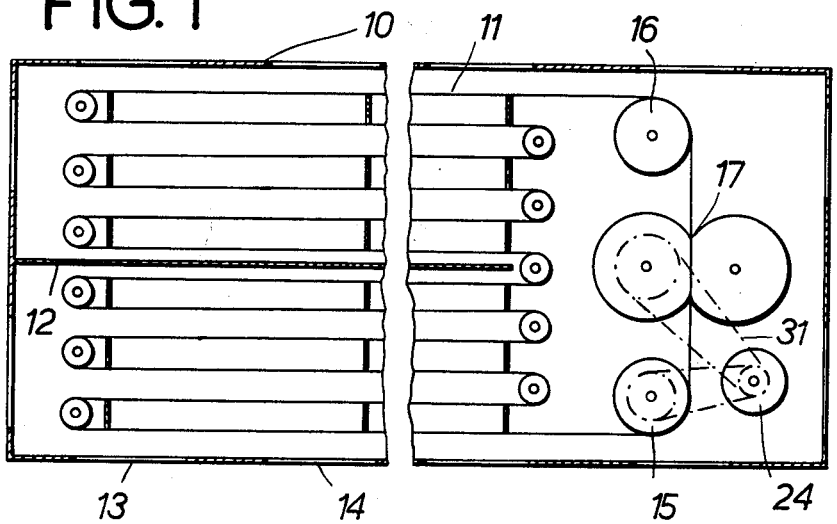
FIGURE 1 is a diagrammatic sectional plan view of a cod flake drying apparatus in which the fish is subjected to several pressing operations at intermediate stages during drying.

Referring to the drawings (particularly FIGURE 1) the drying plant comprises a housing 10 enclosing an endless conveyor 11 for the cod flakes. In order to control the drying effect within said housing, a partition 12 is arranged in the housing at suitable location. Inspection windows 13 and an access door 14 are provided in the housing 10 to permit control of and access to the drying space within the housing.

One run of the endless conveyor 11 extends in a zigzag pattern between two supporting rollers 15, 16 and a pressure applying device 17 is located in a second, direct run of the conveyor between the rollers 15, 16.

Referring to FIGURE 2, the conveyor 11 is supported and guided by rail forming iron strips 18 cooperating with upper channel iron members 19 having their channel openings facing downwardly. Rollers 20 are supported by the rail strips and the channel members 19 support guide rollers 21 which are mounted on the same member as, but transversely to, the rollers 20, the lower part of this member being provided with clip members 22 from which the cod flakes 23 to be dried are suspended. In FIGURE 2, a cod flake to be dried is indicated in broken lines in the upper half of said figure, it being understood that a plurality of clip members 22 with associated rollers 20, 21 are interconnected by a chain or belt (not shown) to form the endless moving conveyor 11. Within the housing 10 there is provided a prime mover 24, preferably an electric motor with associated variable transmission, which transmits its movement to the roller 15 so as to move the conveyor through the housing, as indicated in FIGURE 1.

Figure 3:
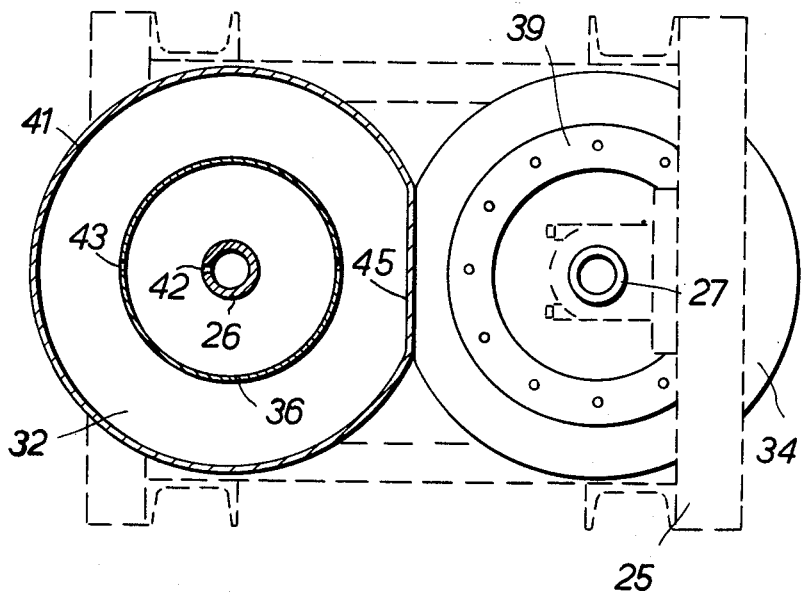
FIGURE 3 is, in part, a plan view and, in part a sectional view of the pressure applying device of FIGURE 2.

With particular reference to FIGURES 2 and 3 the pressure applying device comprises a frame 25 in which two vertical hollow shafts 26 and 27 are mounted by means of bottom bearings 28, intermediate bearings 29, and top bearings 30. The shafts 26, 27 are spaced apart by a predetermined distance which is preferably adjustable in a manner not shown. The shaft 26 carries at its lower end a driving belt or rope pulley 31 for driving same.

Each of said shafts supports two press rolls, the rolls 32 and 33 on one shaft 26, and the rolls 34 and 35 on the other shaft 27, respectively. Thus, it will be seen from FIGURE 2 that two superimposed conveyor paths are present in the apparatus. However, as both conveyor paths are identical, only the upper one will be considered in detail, it being understood that the lower one contains identical parts and operates in the same manner.

Each press roll for instance the upper roll 32 on the shaft 26, comprises a hollow central cylinder 36 secured to the associated shaft 26. The hollow cylinder carries at each end a circular end plate 37, 38 of greater diameter than the cylinder. Tightening discs 39, 40 co-operate with the end plates 37, 38, respectively, to support a cylindrical rubber bag 41 which is received in an air-tight manner between the end plate 37 and the disc 39 at one end and between the end plate 38 and the disc 40 at the opposite end. The outer circumferential face of the rubber bag 41 forms the press roll face engaging the cod flake to be pressed.

The interior of the shaft 26 communicates through perforations 42 with the hollow cylinder 36 and the cylindrical face of the hollow cylinder 36 is provided with perforations 43 communicating with the interior of the cylindrical rubber bag 41; by means of these perforations fluid under superatmospheric pressure may be supplied to the interior of the cylindrical rubber bag. The fluid, preferably air, is supplied to the hollow shafts 26 and 27 by a pressure pipe system generally indicated at 44 from a pressure source, not shown.

The diameters of the rubber bag 41 exceed the spacing between the shafts 26, 27, so that when the bags are inflated by the air pressure supplied thereto there is a substantial area in mutual contact between each pair of bags. This enables uniform and smooth pressure to be applied to the fish. In addition, this substantial area of contact, in combination with the feature of driving only one roll, while mounting the other roll for idling, prevents any slip between the fish and the rolls or between the rolls themselves. This prevents the rolls from having any burnishing effect on the surface of the cod flakes, which is a highly undesired effect occurring when massive rolls are used.

Furthermore, it will be seen from FIGURE 2 that the clips 22 supporting the cod flakes are not introduced between the rolls. This arrangement is adopted in order to prevent wear on the surface of the roll bags, but it also enables a well-known arrangement comprising a set of opposite guide rails between which the clips are guided to obtain automatic release of the suspended cod flakes, to be used. In this known arrangement, the clips are opened by engagement with protrusions provided on such guide rails, the protrusions being retractable when circulation without release of the cod flakes is desired.

In the present apparatus, the fish flakes are preferably subjected to several cycles of circulation and pressing operations before reaching the bone dry state. The number of pressing operations is regulated by adjusting the speed of the conveyor.

It should be noted that it is possible to use hydraulic fluid from a constant pressure source to inflate the rubber bags instead of air.

What I claim is:

1. Apparatus for subjecting fish flakes to a pressing operation at intermediate stages during drying comprising in combination a housing, two inflatable cylindrical bags therein rotatably mounted in a fluid tight condition, means for inflating said bags from a source of pressure fluid, said bags having parallel axes of rotation spaced apart by a distance less than one-half of the sum of the diameters of the bags on inflation, an endless belt, upper and lower guide members, a plurality of intermediate guide members arranged between said upper and lower guide members and interconnected by said endless belt, upper and lower guide rollers each engaging a corresponding one of said upper and lower guide members, each intermediate guide member carrying an upper and a lower guide roller disposed with their axes at right angles to each other, means for rotating one bag and for driving said conveyor belt, the second bag being rotatable by pressure contact with the first bag, a plurality of clip means for suspending said cod flakes connected to corresponding intermediate guide members, said endless belt having a path of travel relative to the location of said bags causing the cod flakes to be conveyed to the nip therebetween and the clip means to pass adjacent, but outside, the nip.

2. Apparatus for subjecting fish flakes to a pressing operation at intermediate stages during drying comprising in combination a housing, an endless conveyor therein having a first run extending in a zigzag fashion, a second run forming a connection between the ends of said first run and a conveyor roll arranged at each end of said second run, two inflatable cylindrical bags mounted in a fluid tight condition for rotation about vertical axes and arranged one on each side of the path of travel of said endless conveyor, means for inflating said bags from a source of pressure fluid, said bags being spaced apart by a distance less than one-half of the sum of the diameters of said bags on inflation, means for jointly rotating one bag and one of said conveyor rolls, means for suspending fish flakes on said endless conveyor, the latter having a path of travel causing the fish flakes to be conveyed to the nip between said bags on inflation, the second bag being rotatable by pressure contact with said first bag.

3. Apparatus according to claim 2, wherein two vertical hollow shafts are rotatably mounted in parallel spaced apart relation, a hollow cylinder is mounted on each vertical shaft, a circular end plate is secured at each of the ends of said hollow cylinders having a diameter greater than its respective cylinder, a tightening disc cooperating with each end plate, one of the two inflatable cylindrical bags being arranged about each hollow cylinder and secured at each end in a fluid tight condition between a tightening disc and an end plate, the walls of the hollow shafts having apertures formed therein providing communication between the interiors thereof and the hollow cylinders, the walls of the hollow cylinders also having apertures formed therein providing communication with said cylindrical bags, the arrangement being such that pressure fluid can be supplied to the said bags via said shafts and said cylinders.

4. Apparatus for subjecting fish flakes to a pressing operation at intermediate stages during drying comprising in combination within a housing, an endless conveyor having a first run extending in a zigzag fashion and a second run forming a connection between the ends of the first run, said conveyor comprising an endless belt, a conveyor roll arranged at each end of said second run, upper and lower guide rails, a plurality of intermediate guide members arranged between said guide rails and interconnected by said endless belt, upper and lower guide rollers each engaging a corresponding one of said guide rails, each intermediate guide member carrying an upper and lower guide roller disposed with their axes at right angles to each other; two inflatable cylindrical rubber bags mounted in a fluid tight condition for rotation about vertical axes and arranged one on each side of the path of travel of said endless belt, means for inflating said bags from a source of pressure fluid, said bags being spaced apart by a distance less than one-half of the sum of the diameters of said bags on inflation, means for jointly rotating a first rubber bag and one of said conveyor rolls, a second rubber bag being rotatable by pressure contact with said first bag, a plurality of clip means for suspending said flakes and connected to corresponding intermediate guide members, the path of travel of said endless belt relative to the location of said bags being such as to cause the fish flakes to be conveyed to the nip therebetween and the clip means to pass adjacent, but outside, the nip.

5. Apparatus according to claim 4, wherein a partition is mounted in the housing substantially midway through the first run of the endless belt for facilitating control of drying within the housing.

References Cited in the file of this patent
UNITED STATES PATENTS

| | | |
|---|---|---|
| 987,394 | Passburg | Mar. 21, 1911 |
| 1,563,130 | Weston | Nov. 24, 1925 |
| 1,991,324 | Keech | Feb. 12, 1935 |
| 2,331,126 | Loomis | Oct. 5, 1943 |
| 2,732,627 | Fava | Jan. 31, 1956 |
| 2,877,122 | Hiller | Mar. 10, 1959 |